United States Patent
Yunus et al.

(10) Patent No.: US 12,214,822 B2
(45) Date of Patent: Feb. 4, 2025

(54) TRAILER ASSIST SYSTEM WITH ENHANCED BEAM LENGTH ESTIMATION

(71) Applicant: Magna Electronics Inc., Auburn Hills, MI (US)

(72) Inventors: Anam M. Yunus, Markham (CA); David A. Gomez, Mississauga (CA); Jinyi Tan, Stirling (CA); Yi Zhou, Toronto (CA)

(73) Assignee: Magna Electronics Inc., Auburn Hills, MI (US)

( * ) Notice: Subject to any disclaimer, the term of this patent is extended or adjusted under 35 U.S.C. 154(b) by 487 days.

(21) Appl. No.: 16/946,542

(22) Filed: Jun. 26, 2020

(65) Prior Publication Data

US 2020/0406967 A1   Dec. 31, 2020

Related U.S. Application Data (60) Provisional application No. 62/952,748, filed on Dec. 23, 2019, provisional application No. 62/938,411, filed on Nov. 21, 2019, provisional application No. 62/868,051, filed on Jun. 28, 2019.

(51) Int. Cl.
*B62D 13/06* (2006.01)
*B60R 11/04* (2006.01)
*B62D 15/02* (2006.01)

(52) U.S. Cl.
CPC ............ *B62D 15/025* (2013.01); *B60R 11/04* (2013.01); *B62D 13/06* (2013.01); *B62D 15/0275* (2013.01)

(58) Field of Classification Search
CPC .. B62D 15/025; B62D 13/06; B62D 15/0275; B62D 15/028; B60R 11/04
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |

(Continued)

FOREIGN PATENT DOCUMENTS

WO   WO-2017036810 A1 *   3/2017   ............... B60R 1/00

OTHER PUBLICATIONS

Chu et al. Estimation of Articulation Angle for Tractor Semi-trailer Based on State Observer, International Conference on Measuring Technology and Mechatronics Automation (Year: 2010).*

*Primary Examiner* — Elaine Gort
*Assistant Examiner* — Chanmin Park
(74) *Attorney, Agent, or Firm* — HONIGMAN LLP (57) ABSTRACT

A vehicular trailering assist system for a vehicle includes a camera disposed at a rear portion of a vehicle and having a field of view exterior and at least rearward of the vehicle, the field of view encompassing at least a portion of a trailer hitched to the vehicle. A control includes a processor for processing image data captured by the camera and sensor data captured by a steering wheel angle sensor and a wheel RPM sensor. The control determines a trailer angle of the trailer relative to the vehicle, a steering wheel angle, and a wheel RPM of a wheel of the vehicle. The control estimates a trailer beam length based on at least the determined trailer angle, the determined steering wheel angle, and the determined wheel RPM.

22 Claims, 5 Drawing Sheets

(56) References Cited

U.S. PATENT DOCUMENTS

| | | |
|---|---|---|
| 6,498,620 B2 | 12/2002 | Schofield et al. |
| 6,690,268 B2 | 2/2004 | Schofield et al. |
| 7,038,577 B2 | 5/2006 | Pawlicki et al. |
| 7,720,580 B2 | 5/2010 | Higgins-Luthman |
| 7,855,755 B2 | 12/2010 | Weller et al. |
| 9,085,261 B2 | 7/2015 | Lu et al. |
| 9,264,672 B2 | 2/2016 | Lynam |
| 9,446,713 B2 | 9/2016 | Lu et al. |
| 9,558,409 B2 | 1/2017 | Pliefke et al. |
| 10,071,687 B2 | 9/2018 | Ihlenburg et al. |
| 10,086,870 B2 | 10/2018 | Gieseke et al. |
| 10,099,614 B2 | 10/2018 | Diessner |
| 10,160,382 B2 | 12/2018 | Pliefke et al. |
| 10,532,698 B2 | 1/2020 | Potnis et al. |
| 10,552,976 B2 | 2/2020 | Diessner et al. |
| 10,586,119 B2 | 3/2020 | Pliefke et al. |
| 10,638,025 B2 | 4/2020 | Gali et al. |
| 10,706,291 B2 | 7/2020 | Diessner et al. |
| 10,733,757 B2 | 8/2020 | Gupta et al. |
| 10,755,110 B2 | 8/2020 | Bajpai |
| 11,417,116 B2 | 8/2022 | Joseph et al. |
| 2004/0021291 A1* | 2/2004 | Haug .................. B60T 8/1708 280/455.1 |
| 2007/0027586 A1* | 2/2007 | Deng .................... B60T 8/172 701/1 |
| 2014/0063197 A1 | 3/2014 | Yamamoto et al. |
| 2014/0085472 A1 | 3/2014 | Lu et al. |
| 2014/0160276 A1 | 6/2014 | Pliefke et al. |
| 2014/0267688 A1 | 9/2014 | Aich et al. |
| 2015/0002670 A1 | 1/2015 | Bajpai |
| 2015/0217693 A1 | 8/2015 | Pliefke et al. |
| 2016/0049020 A1 | 2/2016 | Kuehnle et al. |
| 2017/0050672 A1 | 2/2017 | Gieseke et al. |
| 2017/0174128 A1 | 6/2017 | Hu et al. |
| 2017/0217372 A1 | 8/2017 | Lu et al. |
| 2017/0254873 A1 | 9/2017 | Koravadi |
| 2017/0280091 A1 | 9/2017 | Greenwood et al. |
| 2017/0341583 A1 | 11/2017 | Zhang et al. |
| 2018/0211528 A1 | 7/2018 | Seifert |
| 2018/0215382 A1 | 8/2018 | Gupta et al. |
| 2018/0253608 A1 | 9/2018 | Diessner et al. |
| 2018/0276838 A1 | 9/2018 | Gupta et al. |
| 2018/0276839 A1 | 9/2018 | Diessner et al. |
| 2019/0016264 A1 | 1/2019 | Potnis et al. |
| 2019/0039649 A1 | 2/2019 | Gieseke et al. |
| 2019/0042864 A1 | 2/2019 | Pliefke et al. |
| 2019/0064831 A1 | 2/2019 | Gali et al. |
| 2019/0118860 A1 | 4/2019 | Gali et al. |
| 2019/0143895 A1 | 5/2019 | Pliefke et al. |
| 2019/0241126 A1 | 8/2019 | Murad et al. |
| 2019/0242972 A1* | 8/2019 | Melzer .................. G01S 13/93 |
| 2019/0297233 A1 | 9/2019 | Gali et al. |
| 2019/0329821 A1 | 10/2019 | Ziebart et al. |
| 2019/0347498 A1 | 11/2019 | Herman et al. |
| 2019/0347825 A1 | 11/2019 | Gupta et al. |
| 2020/0017143 A1 | 1/2020 | Gali |
| 2020/0139976 A1* | 5/2020 | Magnusson ............. G01C 21/32 |
| 2020/0282910 A1* | 9/2020 | Nagasamy ............. B60D 1/245 |
| 2020/0333436 A1* | 10/2020 | Insana .................. G01S 13/449 |
| 2020/0334475 A1 | 10/2020 | Joseph et al. |
| 2020/0356788 A1 | 11/2020 | Joseph et al. |
| 2020/0361397 A1 | 11/2020 | Joseph et al. |
| 2020/0406967 A1 | 12/2020 | Yunus et al. |
| 2021/0078634 A1 | 3/2021 | Jalalmaab et al. |
| 2021/0094473 A1 | 4/2021 | Gali et al. |
| 2021/0170820 A1 | 6/2021 | Zhang |
| 2021/0170947 A1 | 6/2021 | Yunus et al. |

* cited by examiner

| Max Front wheel angle (+/-) [deg] | Max Trailer Beam Length [m] |
|---|---|
| 25 | 7.38 |
| 26 | 7.01 |
| 27 | 6.67 |
| 28 | 6.34 |
| 29 | 6.04 |
| 30 | 5.75 |
| 31 | 5.48 |
| 32 | 5.22 |
| 33 | 4.97 |
| 34 | 4.74 |
| 35 | 4.51 |
| 36 | 4.30 |
| 37 | 4.09 |
| 38 | 3.89 |
| 39 | 3.70 |
| 40 | 3.51 |

FIG. 4

TRAILER ASSIST SYSTEM WITH ENHANCED BEAM LENGTH ESTIMATION

CROSS REFERENCE TO RELATED APPLICATIONS

The present application is related to U.S. provisional applications, Ser. No. 62/952,748, filed Dec. 23, 2019, Ser. No. 62/938,411, filed Nov. 21, 2019, and Ser. No. 62/868,051, filed Jun. 28, 2019, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. Trailer assist systems are known that may determine an angle of a trailer hitched at a vehicle. Examples of such known systems are described in U.S. Pat. No. 9,085,261 and/or 6,690,268, which are hereby incorporated herein by reference in their entireties.

SUMMARY OF THE INVENTION

The present invention provides a driver assistance system or vision system or imaging system for a vehicle that utilizes a camera disposed at a rear portion of a vehicle and having a field of view exterior of the vehicle, the field of view encompassing at least a portion of a trailer hitched to the vehicle. The system also includes a steering wheel angle sensor operable to determine a steering wheel angle of the vehicle and a wheel revolutions per minute (RPM) sensor operable to determine an RPM of a wheel of the vehicle. The system also includes a control comprising an image processor operable to process image data captured by the camera and sensor data captured by the sensors, with the image data captured by the camera representative of the trailer hitched to the vehicle. The control, responsive to processing of image data captured by the camera, determines a trailer angle of the trailer relative to the vehicle and may determine or be provided with a hitch location relative to a rear axle of the vehicle. The control, responsive to processing of sensor data from the steering wheel angle sensor and the RPM sensor determines a steering wheel angle of the vehicle and a wheel RPM of the vehicle. The control estimates a trailer beam length using the determined trailer angle, the determined steering wheel angle, and the determined wheel RPM. The determined or provided hitch location relative to the rear axle of the vehicle may also be used in the trailer beam length estimation.

These and other objects, advantages, purposes and features of the present invention will become apparent upon review of the following specification in conjunction with the drawings.

DESCRIPTION OF THE PREFERRED EMBODIMENTS

A vehicle and trailer maneuvering system or maneuver assist system and/or driving assist system operates to capture images exterior of the vehicle and of a trailer being towed by the vehicle and may process the captured image data to determine a path of travel for the vehicle and trailer and to detect objects at or near the vehicle and in the predicted path of the vehicle, such as to assist a driver of the vehicle in maneuvering the vehicle and trailer in a rearward direction. The vision system includes an image processor or image processing system that is operable to receive image data from one or more cameras and that may provide an output to a display device for displaying images representative of the captured image data. Optionally, the vision system may provide a display, such as a rearview display or a top down or bird's eye or surround view display or the like.

Figure 1:
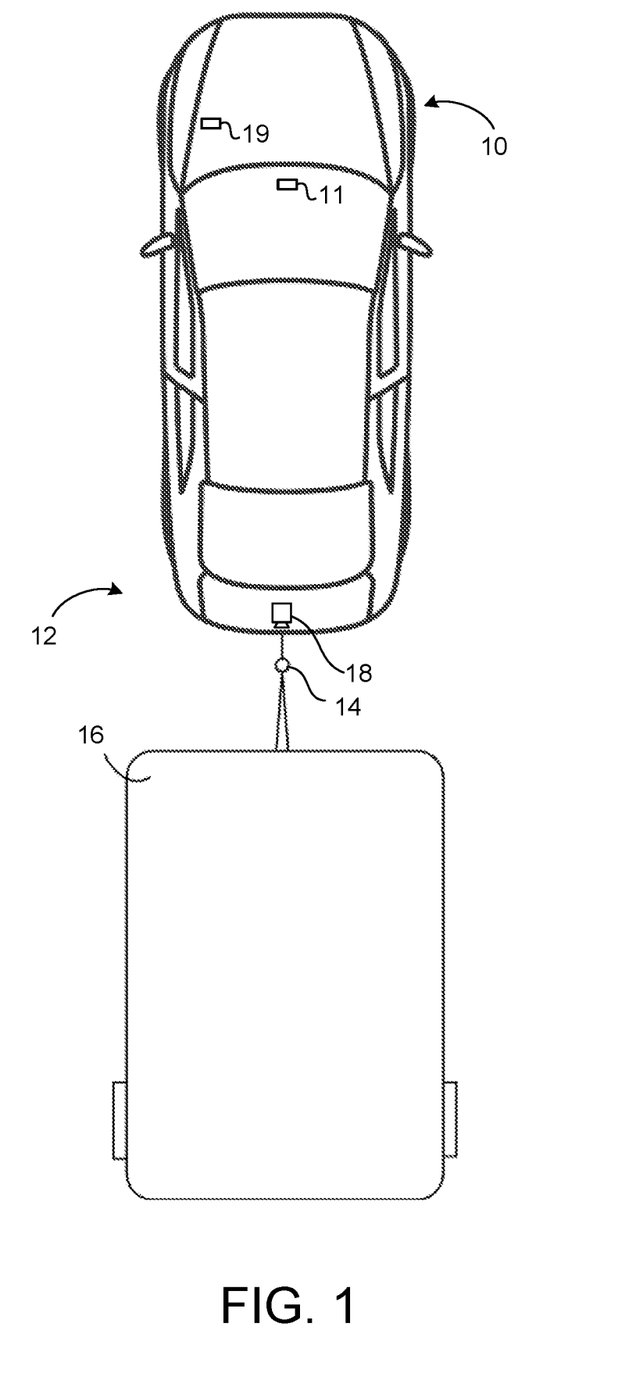
FIG. 1 is a plan view of a vehicle with a trailer assist system that is operable to steer a trailer along a trailer direction in accordance with the present invention.

Referring now to the drawings and the illustrative embodiments depicted therein, a vehicle 10 includes a trailer assist system 12 (such as part of a rear backup assist system) that is operable to assist in backing up or reversing the vehicle with a hitched trailer that is hitched at the rear of the vehicle via a trailer hitch 14, and the system may maneuver the vehicle 10 and trailer 16 toward a desired or selected location. The trailer assist system 12 includes at least one exterior viewing vehicle-based imaging sensor or camera, such as a rearward viewing imaging sensor or camera 18, which may comprise a rear backup camera of the vehicle (and the system may optionally include multiple exterior viewing imaging sensors or cameras, such as a sideward/rearward viewing camera at respective sides of the vehicle), which captures image data representative of the scene exterior and at least rearward of the vehicle 10, with the field of view of the camera encompassing the trailer hitch 14 and/or trailer 16, and with the camera 18 having a lens for focusing images at or onto an imaging array or imaging plane or imager of the camera (FIG. 1). Optionally, a forward viewing camera may be disposed at the windshield of the vehicle 10 and view through the windshield and forward of the vehicle 10, such as for a machine vision system (such as for traffic sign recognition, headlamp control, pedestrian detection, collision avoidance, lane marker detection and/or the like). The trailer assist system 12 includes a control 11 or electronic control unit (ECU) having electronic circuitry and associated software, with the electronic circuitry including a data processor or image processor that is operable to process image data captured by the camera or cameras and that may detect objects or the like and/or provide displayed images at a display device for viewing by the driver of the vehicle (the control and/or display device may be part of or incorporated in or at an interior rearview mirror assembly of the vehicle, or the control and/or the display device may be disposed elsewhere at or in the vehicle). The data transfer or signal communication from the camera to the ECU may comprise any suitable data or communication link, such as a vehicle network bus or the like of the equipped vehicle. The system 12 may also include one or more sensors 19. For example, a steering wheel angle sensor and/or a revolution per minute (RPM) wheel sensor.

Trailer beam length is an important if not essential parameter for many automated trailering applications (e.g., reversing, jackknife prevention, parking, etc.) because automated trailering requires accurate position and heading predictions for the vehicle-trailer system. The accuracy of these kinematic predictions depends on the measurement accuracy of parameters such as beam length. Trailer beam length for single-axle trailers is defined as the length from the hitch point to the rear axle. For multi-axle trailers, the effective kinematic trailer beam length is defined as the length from the hitch point to an intermediate point between the multiple axles. Ideally, beam length is measured or estimated or determined using an automatic or online method, as otherwise the user or driver must manually measure every time a different trailer is hitched. Manual measuring of beam length can be difficult, especially for long and/or multi-axle trailers. Additionally, the accuracy of such measurements is highly dependent upon the user and the tool used.

Implementations of the present invention estimate trailer beam length online using vehicle and trailer kinematics with input from vehicle sensors (e.g., a visual hitch point detection system and a trailer angle detection system). Implementations provided estimate the trailer beam length for any trailer currently hitched to the vehicle with minimal user setup requirements and eliminates the need for the driver to manually measure.

Figure 2:
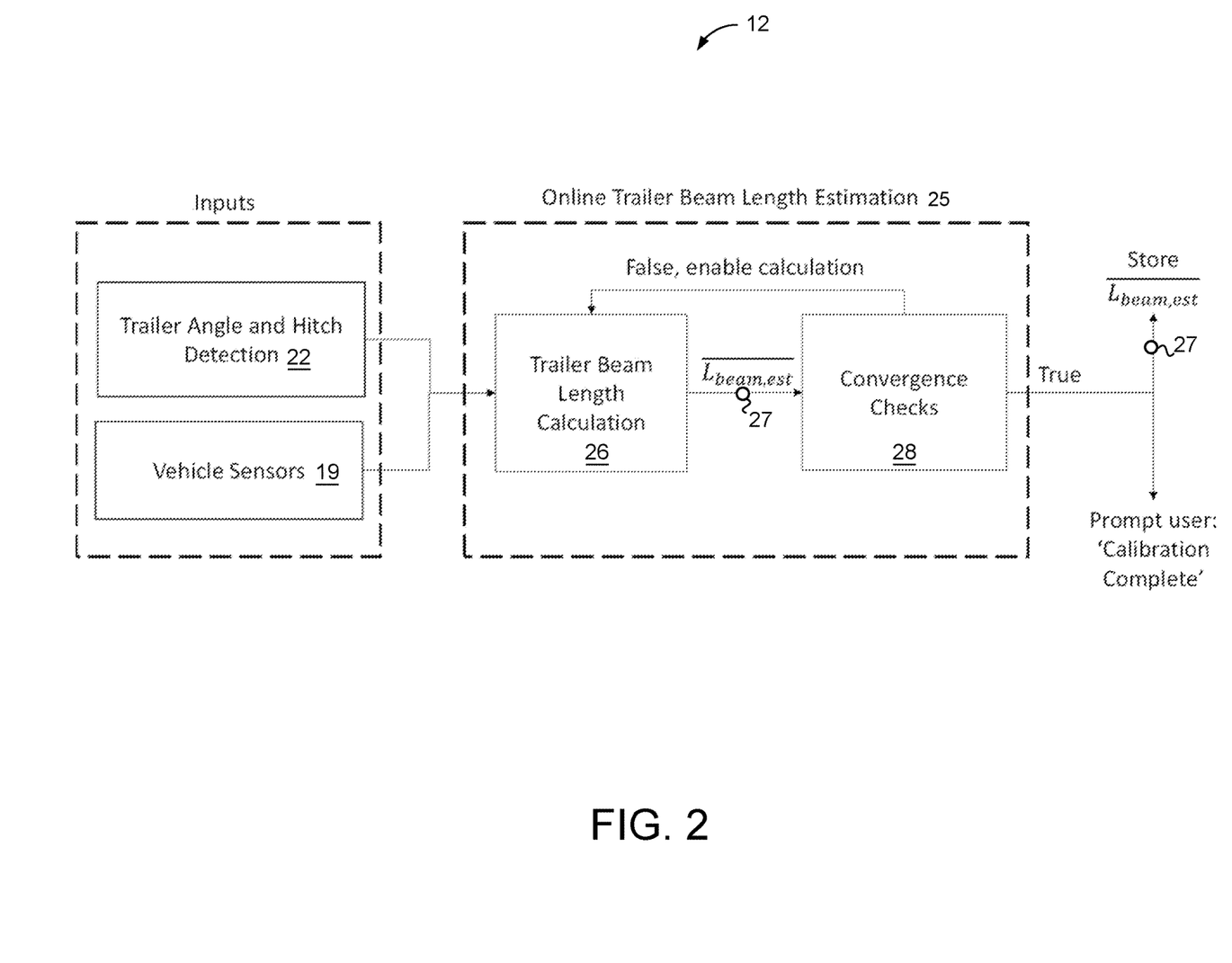
FIG. 2 is a block diagram of the trailer assist system of FIG. 1.

Referring now to FIG. 2, the trailer assist system 12 includes a trailer angle and hitch detection system 22 (e.g., a hitch location and trailer angle). Other vehicle sensors 19 may also be included (e.g., to measure vehicle speed, wheel angle, etc.). The system, as discussed in more detail below, directs a driver to undergo calibration driving maneuvers. During these maneuvers, the system processes data from these sensors and cameras and passes the data to an online trailer beam length estimator 25 that estimates a trailer beam length 27 at a trailer beam length calculator 26. The estimator 25 may then conduct a convergence check 28. If there is not a convergence (i.e., convergence is false), the calculator 26 again estimates the trailer beam length 27. If there is convergence (i.e., convergence is true), the estimator 25 stores the beam length estimation 27 in non-volatile memory and prompts the user that calibration is complete.

Figure 3A:
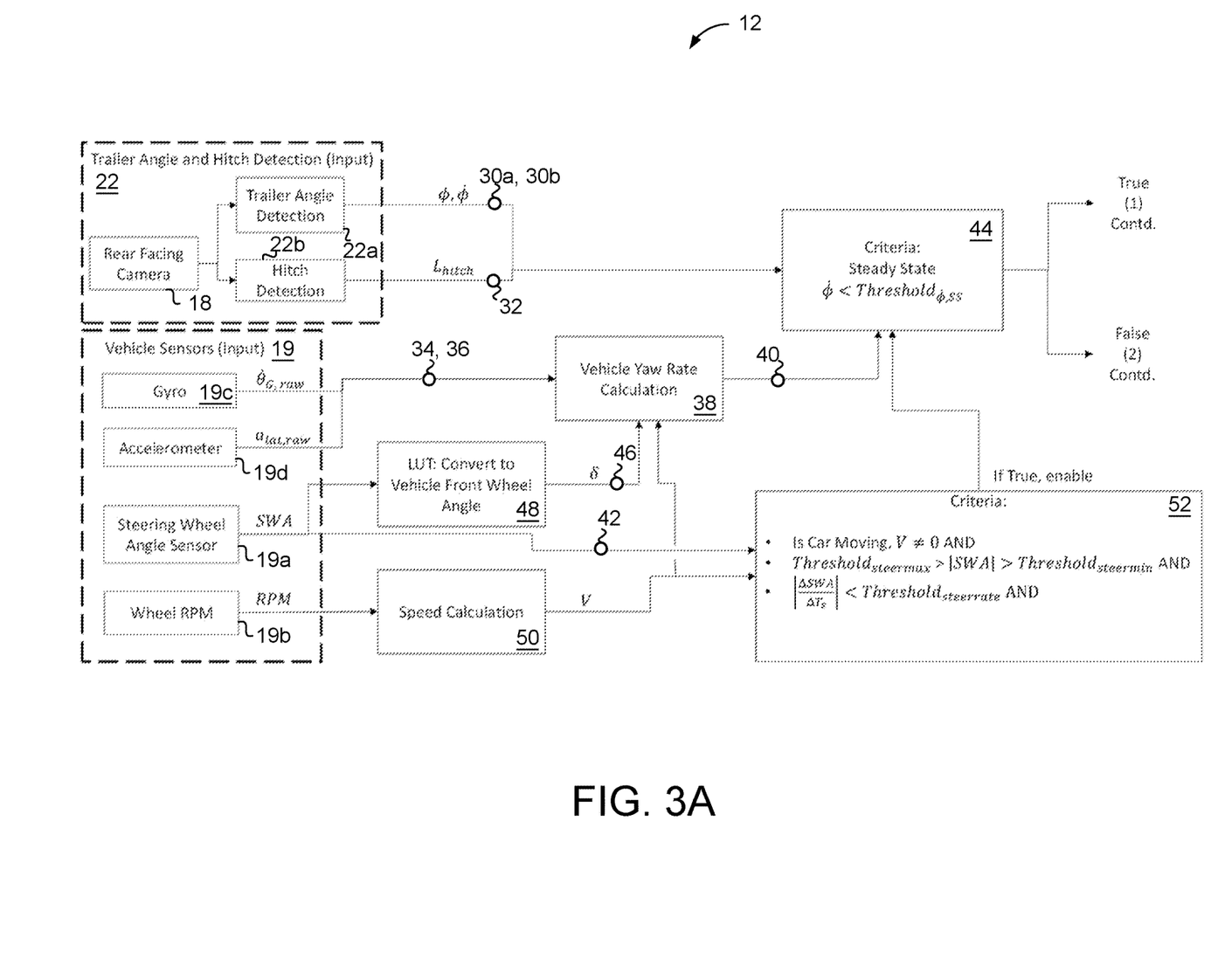
FIGS. 3A and 3B are detailed block diagrams of the block diagram of FIG. 2.

Referring now to FIG. 3A, in some examples, the trailer angle and hitch detection system 22 of the trailer assist system 12 uses inputs received from a rear-facing camera 18 to determine a relative vehicle-trailer angle in degrees ($\varphi$) 30a and a relative vehicle-trailer angular velocity ($\dot{\varphi}$) 30b at a trailer angle detector 22a. The system 22 also determines a distance from the vehicle rear axle to the hitch point ($L_{hitch}$) a hitch detector 22b. The system 12 includes a number of input vehicle sensors 19. For example, a steering wheel angle sensor 19a determines an angle of the steering wheel (SWA) and a wheel revolutions per minute sensor 19b determines the revolutions per minute of a vehicle wheel (RPM) respectively.

In some examples, a gyroscope 19c determines the vehicle yaw rate 34 ($\dot{\theta}_{G,raw}$) and an accelerometer 19d determines an acceleration rate 36 ($a_{lat,raw}$) to calculate a vehicle yaw rate 40 at a vehicle yaw rate calculator 38. The vehicle yaw rate 40 may be calculated a number of different ways. For example, the using the steering wheel angle sensor 19a and a bicycle kinematic model of Equation (1) may calculate the vehicle yaw rate 40 ($\dot{\theta}_B$):

$$\dot{\theta}_B = \frac{V}{L_{wheelbase}} \tan(\delta) \quad (1)$$

In Equation (1), V represents the vehicle speed, $L_{wheelbase}$ represents the vehicle's wheelbase, and $\delta$ represents the vehicle front wheel angle (e.g., from a look up table mapping $\delta$ to steering wheel angle (SWA)). The vehicle yaw rate 40 ($\dot{\theta}_G$) may also be calculated using the gyroscope 19c with Equation (2):

$$\dot{\theta}_G = \dot{\theta}_{G,raw} \dot{\theta}_{G,bias} \quad (2)$$

In Equation (2), $\dot{\theta}_{G,raw}$ represents the raw gyroscope measurement, while $\dot{\theta}_{G,bias}$ represents the gyroscope zero bias. The vehicle yaw rate 40 ($\dot{\theta}_{ws}$) may also be calculated using differential wheel speeds from the wheel RPM sensors 19b using Equation (3):

$$\dot{\theta}_{ws} = \frac{V_{RR} - V_{RL}}{L_{tw}} - \dot{\theta}_{ws,bias} \quad (3)$$

In Equation (3), $V_{RL}$ and $V_{RR}$ represent the rear right and the rear left wheel speeds respectively. The track width is represented by $L_{tw}$ and $\dot{\theta}_{ws, bias}$ represents zero bias in the yaw rate calculated from wheel speeds. The vehicle yaw rate 40 ($\dot{\theta}_a$) may also be calculated using the accelerometer 19d using Equation (4):

$$\dot{\theta}_a = \frac{(a_{lat,raw} - a_{lat,bias})}{V} \quad (4)$$

In Equation (4), V represents the vehicle speed, $a_{lat,raw}$ represents the raw lateral acceleration measurement, and $a_{lat, bias}$ represents the lateral acceleration zero bias. In some implementations, the vehicle yaw rate 40 may be estimated from any subset of these sensors using Equation (5):

$$\dot{\theta} = w_B \dot{\theta}_B w_G \dot{\theta}_G + w_{ws} \dot{\theta}_{ws} + w_a \dot{\theta}_a \quad (5)$$

In Equation (5), $w_B, w_G, w_{ws}, w_a$ (i.e., each w variable) is an individual weight for each respective sensor 19a-d based on, for example, sensor noise characteristics, resolution, and accuracy of estimation. That is, each sensor 19 may be individually weighted and the vehicle yaw rate calculation may be estimated based on any subset of the sensors (with the weights shifting accordingly). For example, a more accurate and/or reliable sensor 19 may be weighted more than a less accurate and/or less reliable sensor 19. A sensor 19 that fails or otherwise fails to meet a threshold of quality and/or reliability may be removed from the calculation entirely (i.e., a weight of zero).

Responsive to calibration driving maneuvers conducted by a driver of the vehicle (and possibly prompted by the system) and the calculated vehicle yaw rate 40, the trailer angle and hitch detection system 20 outputs 30a, 30b, 32 (i.e., $\varphi$, $\dot{\varphi}$, and $L_{hitch}$) and the vehicle yaw rate 40 may be used to determine when the relative vehicle-trailer angular velocity reaches an approximate steady-state at steady state determiner 44. That is, these outputs are used to determine when the relative trailer angular velocity is below a threshold amount (e.g., at or near zero). In some examples, a front wheel angle 46 ($\delta$) derived at least in part from a steering wheel angle (SWA) output 42 from the steering wheel angle sensor 19a may be determined a wheel angle converter 48, which in turn may be used to assist in the steady state determination at the determiner 44.

The wheel RPM sensor 19b output, in some implementations, determines a speed calculation (V) of the vehicle at a speed calculator 50. For example, speed may be calculated using the following Equation (6):

$$V = \frac{1}{2}(RPM_{rl} + RPM_{rr}) \cdot L_{whlcirc} \quad (6)$$

In Equation (6), V is vehicle speed (e.g., in meters per second), $RPM_{rl}$ and $RPM_{rr}$ are rear left and rear right wheel revolutions per minute, respectively, and $L_{whlcirc}$ is the effective wheel circumference (e.g., in meters). In some examples, the driver may be required to drive the vehicle during calibration maneuvers at a speed that exceeds a minimum measurement threshold for the wheel RPM sensors for the particular vehicle (i.e., the wheel revolves at a rate greater than a threshold).

Using the velocity of the vehicle V, the system determines, at threshold determiner 52, if the vehicle is moving (i.e., if V is not equal to zero or is near zero), if the absolute value of the SWA 42 is greater than a minimum threshold steering angle and less than a maximum threshold steering angle, and if the absolute value of the change in SWA 42 is less than a threshold steer rate. If all three conditions are true, the system enables the steady state determiner 44. That is, the steady state determiner 44 always outputs false when not enabled by the threshold determiner 52. Otherwise, the steady state determiner 44 outputs true or false based on the inputs 30a, 30b, 32, 40 as described above.

Figure 3B:
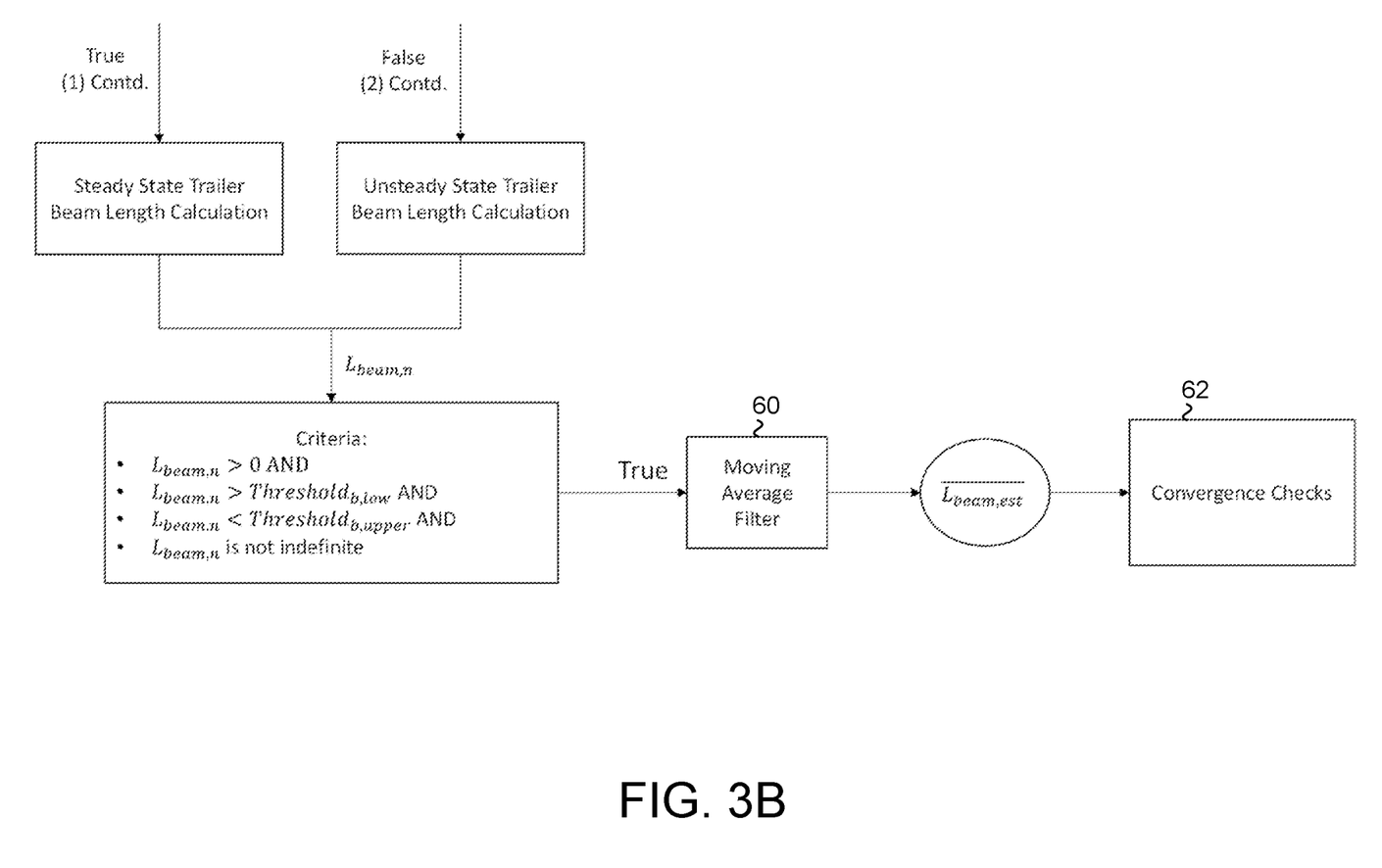

Referring now to FIG. 3B, if the steady state determiner 44 is enabled and outputs true, the system 12 may determine a steady state trailer beam length. If the steady state determiner 44 is not enabled and/or outputs false, the system 12 may determine an unsteady state trailer beam length calculation. Using vehicle-trailer kinematics, the relative vehicle-trailer angle velocity ($\dot{\varphi}$) may be calculated using:

$$\dot{\varphi} = \frac{V}{L_{beam}} \cdot \sin(\varphi) - \dot{\theta}\left(1 + \frac{L_{hitch}}{L_{beam}}\cos(\varphi)\right) \quad (7)$$

In Equation (7), $\varphi$ is the relative vehicle-trailer angle, $L_{beam}$ is the trailer beam length, and $L_{hitch}$ is the distance from the vehicle rear axle to the hitch point. The vehicle yaw rate is represented by $\dot{\theta}$ and V still represents the vehicle speed. Based on Equation (7), the unsteady state trailer beam length (i.e., when $\varphi$ is not equal to zero or near zero) may be estimated using:

$$L_{beam} = -\left(\frac{V\sin(\varphi) + L_{hitch}\cos(\varphi)\dot{\theta}}{\dot{\varphi} + \dot{\theta}}\right) \quad (8)$$

The steady state trailer beam length (i.e., when $\dot{\varphi}$ is equal to zero or near zero) may be estimated using:

$$L_{beam} = -\left(\frac{V\sin(\varphi)}{\dot{\theta}} + L_{hitch}\cos(\varphi)\right) \quad (9)$$

The vehicle-trailer kinematics of Equations (7)-(9) may be dependent upon the assumption that the vehicle and trailer are moving in the same direction as their wheel direction with proper wheel/ground contact (i.e., neither the vehicle nor the trailer are sliding or slipping).

In some implementations, the calibration driving maneuvers may include sufficient curved paths. For example, the user may not receive the "Calibration Complete" message until sufficient curve to the vehicle's path is detected. The vehicle may instruct the driver to turn the wheel a threshold amount while driving forward to achieve sufficient curve. Still referring to FIG. 3B, the system may ensure a valid trailer beam length determination ($L_{beam,calc}$) by determining if $L_{beam,calc}$ is greater than zero, greater than a lower threshold, lower than an upper threshold, and not indefinite. If $L_{beam,calc}$ is valid, (i.e., all criteria are true), then a moving average filter 60 may be applied, which generates $L_{beam,avg}$. The moving average filter, in some examples, has an infinite sliding window. For example, the moving average may be calculated using:

$$w_N = w_{N-1} + 1 \quad (10)$$

and $$\bar{x}_N = \frac{1}{w_N}(w_{N-1} \cdot \bar{x}_{N-1} + x_N) \quad (11)$$

The average at the current sample (N) and the previous sample (N−1) is represented by $\bar{x}_N$ and $\bar{x}_{N-1}$ respectively. The number of data points at the current sample and previous sample is represented by $w_N$ and $w_{N-1}$ respectively and $x_N$ represents the current data input.

The determined $L_{beam,avg}$ may then be passed through one or more convergence checks 62, and if passed, $L_{beam,avg}$ is stored in non-volatile memory of the vehicle where it may be recalled whenever the system detects the respective trailer is hitched.

In some examples, after a minimum number of samples (N), convergence checks are performed over a subset of subsequent beam length calculations. For example, Equation (12) may determine convergence in probability:

$$Pr(|\overline{L_{beam,n}} - \overline{L_{beam,est}}| < \varepsilon) \geq \text{Threshold}_{confidence} \text{ for } n > N \quad (12)$$

In Equation (12), $\overline{L_{beam,est}}$ represents the estimated "true" trailer beam length from the moving average filter at sample $n = n_o$. The variable $\overline{L_{beam,n}}$ represents the sample mean of the trailer beam length from subsequent calculations (i.e., $n > n_o$). The radius of convergence is represented by E.

In some examples, additional criteria to increase accuracy of the estimate includes a monotonicity check:

$$\text{Threshold}_{low} \leq Pr(L_{beam,n} > \overline{L_{beam,est}}) \leq \text{Threshold}_{high} \quad (13)$$

In Equation (13), $L_{beam,n}$ is the calculated trailer beam length for sample n. If the convergence checks pass, the system may prompt the user with a message. For example, the system may indicate that calibration is complete (e.g., via a display screen in the vehicle). The system may store $\overline{L_{beam,est}}$ for use in automated trailering features (e.g., trailer assist systems). If the convergence checks fail, the estimated "true" trailer beam length may be set to equal the latest sample mean of the trailer beam length from the subset $\overline{L_{beam,est}} = \overline{L_{beam,n}}$ and then the convergence checks may be repeated. The system thus includes convergence criteria in the calculation methodology to provide enhanced determination or estimation of the beam length of the trailer being towed by the vehicle.

The thresholds described herein (e.g., rate of change thresholds, steering wheel angle thresholds, etc.) may be empirically chosen for numerical stability of the solution (i.e., the estimation of the trailer beam length), empirically chosen for measurement and timing errors inherent in incoming CAN data, and/or derived from first principles to ensure operation within the valid regions of the kinematic equations.

Optionally, the trailer assist system bounds the estimated trailer beam length between a minimum beam length value and a maximum beam length value to provide a failsafe against aberrant behavior. The driving maneuver may be agnostic (e.g., free form driving with now prescribed calibration maneuvers the driver has to follow) as long as the maneuver has sufficient curves, while the maneuver may be rejected when the maneuver does not have sufficient curves (e.g., is straight or nearly straight) in order to be more robust with regards to errant estimated trailer beam length due to random variables and disturbances. For example, sensor noise, error in state estimation, asynchronous CAN data, environmental factors such as variability in ground conditions, and user calibration drive maneuver variability may all contribute to an errant estimated trailer beam length.

To derive the maximum steering wheel angle (i.e., Threshold$_{steermax}$), the vehicle yaw rate $\dot{\theta}$ may be determined using bicycle kinematics of Equation (14):

$$\dot{\theta} = \frac{V}{L_{wheelbase}} \tan(\delta) \tag{14}$$

Combining Equation (9) with Equation (14) yields Equation (15)-(17):

$$L_{beam} = -\left(\frac{L_{wheelbase}}{\tan(\delta)}\sin(\phi) + L_{hitch}\cos(\phi)\right) \tag{15}$$

$$\frac{dL_{beam}}{d\phi} = -\frac{L_{wheelbase}}{\tan(\delta)}\cos(\phi) + L_{hitch}\sin(\phi) \tag{16}$$

$$\text{When } \frac{dL_{beam}}{d\phi} = 0, \tan(\phi) = \frac{L_{wheelbase}}{L_{hitch}\tan(\delta)} \tag{17}$$

With a constant front wheel angle ($\delta$), the trailer beam length will have extrema when the relative vehicle-trailer angle ($\phi_{ext}$) is equal to Equation (18):

$$\phi_{ext} = \pm\tan^{-1}\left(\frac{L_{wheelbase}}{L_{hitch}\tan(\delta)}\right) \tag{18}$$

For a particular vehicle (i.e., a fixed $L_{wheelbase}$) and given a maximum hitch length ($L_{hitch,max}$), the sign of $\phi_{ext}$ is chosen to give a positive maximum trailer beam length ($L_{Beam_{max}}$). Backward substitution derives Equation (19):

$$L_{Beam_{max}} = -\left(\frac{L_{wheelbase}}{\tan(\delta)}\sin(\phi_{ext}) + L_{hitch,max}\cos(\phi_{ext})\right) \tag{19}$$

Figure 4:
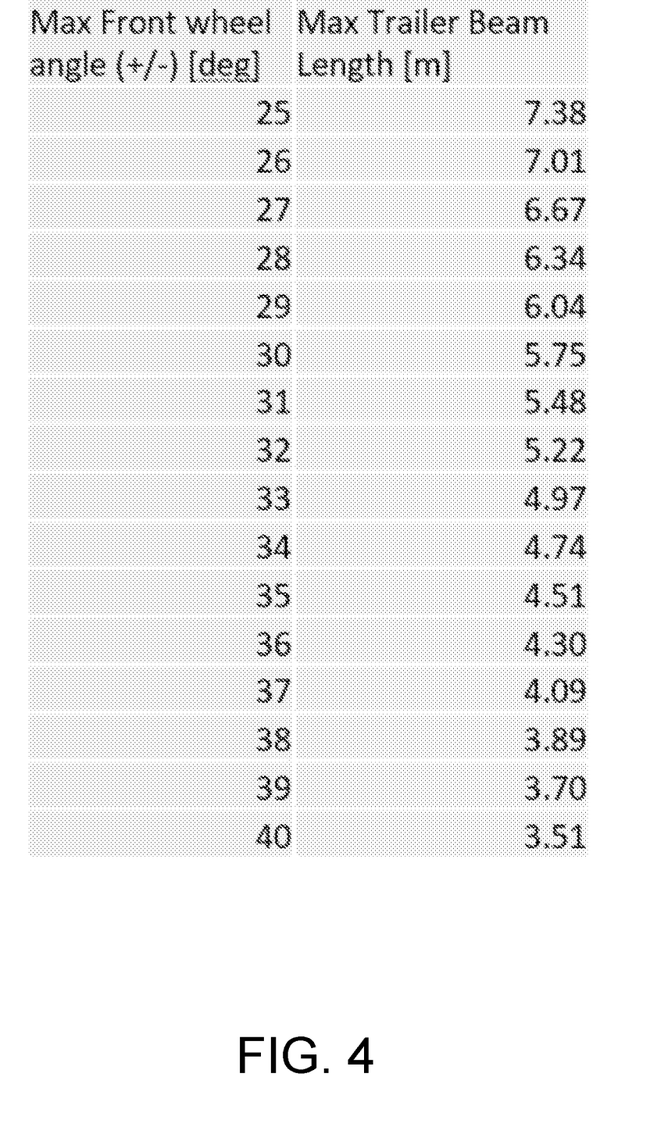
FIG. 4 is a table of exemplary calculations of max front wheel angles and corresponding max trailer beam length.

With a given $L_{Beam_{max}}$, $\delta_{max}$ may be calculated based on Newton's Method using Equation (19). FIG. 4 provides a table for sample calculations relating maximum front wheel angle ($\delta_{max}$) to the maximum trailer beam length ($L_{Beam_{max}}$). That is, the maximum trailer beam length is correlated with the maximum front wheel angle. Threshold$_{steermax}$ may be back calculated from $\delta_{max}$ using, for example, the look up table mapping $\delta$ to steering wheel angle (SWA).

The trailer beam length may be correlated or associated with the specific trailer hitched to the vehicle and recalled whenever the system detects the same trailer is hitched to the vehicle. The correlation (e.g., a trailer identification) may be stored in non-volatile memory with the estimated trailer beam length. The system may prompt or accept a variety of calibration driving maneuvers to accurately estimate the trailer beam length. For example, the vehicle may be driven in a circle with a fixed or variable steering angle. The vehicle may also be driven in arcs with various radii, slaloms, or with multiple right and left turns.

Thus, the system of the present invention determines or estimates or calculates the trailer beam length with high accuracy to enable better performance of other automated trailer features (e.g., backing up, parking, etc.). The driver may switch between trailers and make use of such automated trailer features with minimal setup requirements after initially calibrating each trailer. Furthermore, the accuracy of the trailer beam length estimation is independent from the user skill and measurement tool quality which reduced feature performance variability between users and trailers. The system also eliminates the difficulty of measuring trailer beam length for long and/or multi-axle trailers. The calculation methodology includes convergence criteria and is maneuver agnostic. That is, the driver is not required to perform a prescribed calibration maneuver and instead the system may calibrate from free-form driving.

The system may utilize aspects of the trailering or trailer angle detection systems or trailer hitch assist systems described in U.S. Pat. No. 9,085,261 and/or 6,690,268, and/or U.S. Publication Nos. US-2019-0297233; US-2019-0064831; US-2019-0016264; US-2018-0276839; US-2018-0276838; US-2018-0253608; US-2018-0215382; US-2018-0211528; US-2017-0254873; US-2017-0217372; US-2017-0050672; US-2015-0217693; US-2014-0160276; US-2014-0085472 and/or US-2015-0002670, and/or U.S. patent application Ser. No. 15/929,535, filed May 8, 2020, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular trailering assist system, the vehicular trailering assist system comprising:

a camera disposed at a rear portion of a vehicle and having a field of view exterior and at least rearward of the vehicle, the vehicle having a hitch configured for hitching a trailer at the vehicle, the hitch being at a location spaced from a rear axle of the vehicle, the field of view of the camera including at least a portion of a trailer hitched to the vehicle at the hitch of the vehicle;

a steering wheel angle sensor operable to determine a steering wheel angle of the vehicle;

a wheel revolutions per minute (RPM) sensor operable to determine an RPM of a wheel of the vehicle;

a control comprising electronic circuitry and associated software;

wherein said electronic circuitry of said control comprises at least one data processor for processing image data captured by the camera and sensor data captured by (i) the steering wheel angle sensor and (ii) the wheel RPM sensor;

wherein the control, responsive to processing at the control of image data captured by the camera, determines a trailer angle of the trailer relative to the vehicle;

wherein the control determines the steering wheel angle of the vehicle via sensor data provided to the control from the steering wheel angle sensor;

wherein the control determines the wheel RPM of the wheel of the vehicle via sensor data provided to the control from the RPM sensor;

wherein the control estimates a trailer beam length of the trailer based on at least (i) the determined trailer angle relative to the vehicle, (ii) the determined steering wheel angle of the vehicle and (iii) the determined wheel RPM of the wheel of the vehicle;

wherein the control determines a relative trailer angle velocity, and wherein the relative trailer angle velocity represents a speed of change of the determined trailer angle relative to the vehicle; and wherein, when the determined relative trailer angle velocity is greater than or equal to a threshold, the control further estimates the trailer beam length of the trailer based on the determined relative trailer angle velocity, and wherein, when the determined relative trailer angle velocity is less than the threshold, the control does not estimate the trailer beam length of the trailer with the determined relative trailer angle velocity.

2. The vehicular trailering assist system of claim 1, wherein the control estimates the trailer beam length of the trailer based in part on a hitch location of the hitch relative to the rear axle of the vehicle.

3. The vehicular trailering assist system of claim 1, wherein the control, based on the steering wheel angle, determines a wheel angle of a front wheel of the vehicle.

4. The vehicular trailering assist system of claim 1, wherein the control, based on the RPM of the wheel of the vehicle, determines a speed of the vehicle.

5. The vehicular trailering assist system of claim 1, wherein the control determines the relative trailer angle velocity based on vehicle-trailer kinematics.

6. The vehicular trailering assist system of claim 5, wherein the control, responsive to the determined relative trailer angle velocity being non-zero, estimates an unsteady state trailer beam length of the trailer.

7. The vehicular trailering assist system of claim 5, wherein the control, responsive to the determined relative trailer angle velocity being zero, estimates a steady state trailer beam length of the trailer.

8. The vehicular trailering assist system of claim 1, wherein the control, responsive to estimating the trailer beam length of the trailer, verifies the trailer beam length passes at least one convergence check.

9. The vehicular trailering assist system of claim 1, wherein the control, responsive to estimating the trailer beam length of the trailer, correlates the trailer beam length to the specific trailer hitched to the vehicle and stores the trailer beam length and correlation in non-volatile memory.

10. The vehicular trailering assist system of claim 1, wherein the control, responsive to estimating the trailer beam length of the trailer, determines an average trailer beam length using a moving average filter.

11. The vehicular trailering assist system of claim 10, wherein the moving average filter has an infinite sliding window.

12. The vehicular trailering assist system of claim 1, comprising a gyroscope and an accelerometer, wherein the control, responsive to processing sensor data captured by the gyroscope and the accelerometer, determines a vehicle yaw rate.

13. The vehicular trailering assist system of claim 1, wherein the control determines a yaw rate of the vehicle based at least in part on processing of sensor data captured by the steering wheel angle sensor and the RPM sensor.

14. The vehicular trailering assist system of claim 1, wherein the estimated trailer beam length of the trailer is bounded between a minimum estimated trailer beam length and a maximum estimated trailer beam length.

15. A vehicular trailering assist system, the vehicular trailering assist system comprising:
   a camera disposed at a rear portion of a vehicle and having a field of view exterior and at least rearward of the vehicle, the vehicle having a hitch configured for hitching a trailer at the vehicle, the hitch being at a location spaced from a rear axle of the vehicle, the field of view of the camera including at least a portion of a trailer hitched to the vehicle at the hitch of the vehicle;
   a steering wheel angle sensor operable to determine a steering wheel angle of the vehicle;
   a wheel revolutions per minute (RPM) sensor operable to determine an RPM of a wheel of the vehicle;
   a control comprising electronic circuitry and associated software;
   wherein said electronic circuitry of said control comprises at least one data processor for processing image data captured by the camera and sensor data captured by (i) the steering wheel angle sensor and (ii) the wheel RPM sensor;
   wherein the control, responsive to processing at the control of image data captured by the camera, determines a trailer angle of the trailer relative to the vehicle;
   wherein the control determines the steering wheel angle of the vehicle via sensor data provided to the control from the steering wheel angle sensor;
   wherein the control determines the wheel RPM of the wheel of the vehicle via sensor data provided to the control from the RPM sensor;
   wherein the control, based on the determined steering wheel angle, determines a wheel angle of a front wheel of the vehicle;
   wherein the control estimates a trailer beam length of the trailer based on at least (i) the determined trailer angle relative to the vehicle, (ii) the determined wheel angle of the front wheel of the vehicle, (iii) the determined wheel RPM of the wheel of the vehicle and (iv) a hitch location of the hitch relative to the rear axle of the vehicle;
   wherein the control determines a relative trailer angle velocity, and wherein the relative trailer angle velocity represents a speed of change of the determined trailer angle relative to the vehicle; and
   wherein, when the determined relative trailer angle velocity is greater than or equal to a threshold, the control further estimates the trailer beam length of the trailer based on the determined relative trailer angle velocity, and wherein, when the determined relative trailer angle velocity is less than the threshold, the control estimates the trailer beam length of the trailer without the determined relative trailer angle velocity.

16. The vehicular trailering assist system of claim 15, wherein the control, responsive to estimating the trailer beam length of the trailer, verifies the trailer beam length passes at least one convergence check.

17. The vehicular trailering assist system of claim 15, wherein the control, responsive to estimating the trailer beam length of the trailer, correlates the trailer beam length to the specific trailer hitched to the vehicle and stores the trailer beam length and correlation in non-volatile memory.

18. The vehicular trailering assist system of claim 15, wherein the control, responsive to estimating the trailer beam length of the trailer, determines an average trailer beam length using a moving average filter.

19. The vehicular trailering assist system of claim 18, wherein the moving average filter has an infinite sliding window.

20. A vehicular trailering assist system, the vehicular trailering assist system comprising:
   a camera disposed at a rear portion of a vehicle and having a field of view exterior and at least rearward of the vehicle, the vehicle having a hitch configured for hitching a trailer at the vehicle, the hitch being at a location spaced from a rear axle of the vehicle, the field of view of the camera including at least a portion of a trailer hitched to the vehicle at the hitch of the vehicle;
   a steering wheel angle sensor operable to determine a steering wheel angle of the vehicle;
   a wheel revolutions per minute (RPM) sensor operable to determine an RPM of a wheel of the vehicle;
   a control comprising electronic circuitry and associated software;
   wherein said electronic circuitry of said control comprises at least one data processor for processing image data captured by the camera and sensor data captured by (i) the steering wheel angle sensor and (ii) the wheel RPM sensor;
   wherein the control, responsive to processing at the control of image data captured by the camera, determines a trailer angle of the trailer relative to the vehicle;
   wherein the control determines the steering wheel angle of the vehicle via sensor data provided to the control from the steering wheel angle sensor;
   wherein the control determines the wheel RPM of the wheel of the vehicle via sensor data provided to the control from the RPM sensor;
   wherein the control determines a relative trailer angle velocity, and wherein the relative trailer angle velocity represents a speed of change of the determined trailer angle relative to the vehicle;
   wherein the control, responsive to the determined relative trailer angle velocity being non-zero, estimates an unsteady state trailer beam length of the trailer based on at least (i) the determined trailer angle relative to the vehicle, (ii) the determined steering wheel angle of the vehicle, (iii) the determined wheel RPM of the wheel of the vehicle and (iv) the determined relative trailer angle velocity; and wherein the control, responsive to the determined relative trailer angle velocity being zero, estimates a steady state trailer beam length of the trailer without the determined relative trailer angle velocity and based on at least (i) the determined trailer angle relative to the vehicle, (ii) the determined steering wheel angle of the vehicle and the determined wheel RPM of the wheel of the vehicle.

21. The vehicular trailering assist system of claim 20, comprising a gyroscope and an accelerometer, wherein the control, responsive to processing sensor data captured by the gyroscope and the accelerometer, determines a vehicle yaw rate.

22. The vehicular trailering assist system of claim 20, wherein the control determines a yaw rate of the vehicle based at least in part on processing of sensor data captured by the steering wheel angle sensor and the RPM sensor.

\* \* \* \* \*

UNITED STATES PATENT AND TRADEMARK OFFICE
CERTIFICATE OF CORRECTION

PATENT NO. : 12,214,822 B2
APPLICATION NO. : 16/946542
DATED : February 4, 2025
INVENTOR(S) : Anam M. Yunus et al.

Page 1 of 1

It is certified that error appears in the above-identified patent and that said Letters Patent is hereby corrected as shown below:

In the Claims

Column 13
Line 12, Claim 20, "and the determined" should be --and (iii) the determined--

Signed and Sealed this
Fourth Day of March, 2025

Coke Morgan Stewart
*Acting Director of the United States Patent and Trademark Office*